Mar. 20, 1923.
S. A. GRAY.
AUXILIARY AUTOMOBILE SEAT.
FILED MAY 13, 1922.

Inventor
Sim A. Gray
By Albert Popkins
Attorney

Mar. 20, 1923.
S. A. GRAY.
AUXILIARY AUTOMOBILE SEAT.
FILED MAY 13, 1922.
1,448,841.
2 SHEETS—SHEET 2.
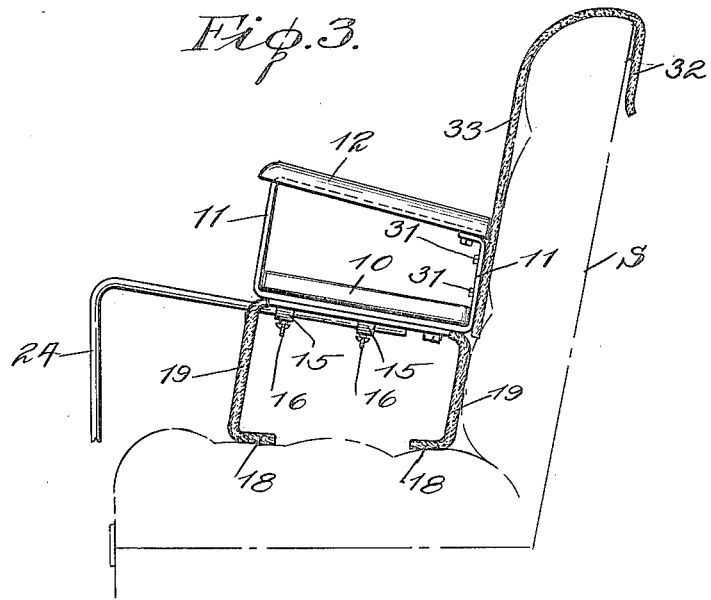
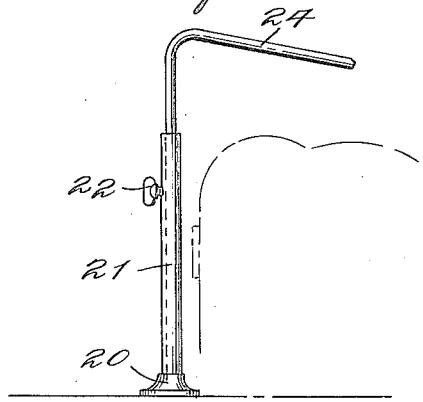
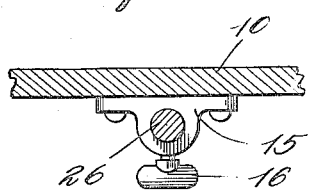
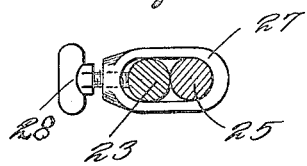
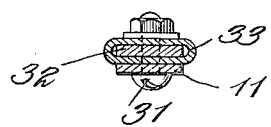
Inventor
Sim A. Gray
by Albert Popkins
Attorney Patented Mar. 20, 1923.

1,448,841

UNITED STATES PATENT OFFICE.

SIM A. GRAY, OF CHATTANOOGA, TENNESSEE.

AUXILIARY AUTOMOBILE SEAT.

Application filed May 13, 1922. Serial No. 560,556.

*To all whom it may concern:*

Be it known that I, SIM A. GRAY, a citizen of the United States of America, residing at Chattanooga, in the county of Hamilton and State of Tennessee, have invented certain new and useful Improvements in Auxiliary Automobile Seats, of which the following is a specification.

This invention relates to automobile attachments and has special reference to an auxiliary automobile seat for children.

More particularly the invention relates to an improvement on the auxiliary automobile seat shown in my prior Patent Number 1,407,408, February 21, 1922.

It has been found by experience with the automobile seat of said prior patent that it is not in many cases, advisable to support the entire weight of the auxiliary seat from the back of the front seat as there shown.

One important object of the present invention is, therefore, to provide an improved general construction of such seat in combination with a support attached to the floor of the automobile body.

A second important object of this invention is to provide a seat of this character wherein arrangement will be made to properly adjust the seat and support so that it may be fitted to any desired size and style of automobile body.

A third important object of the invention is to provide an improved detachable seat so arranged that the seat will not only be supported from the floor but will also be detachably held to the back of the front seat so that sudden stoppage of the automobile will not throw the seat forward.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 3 is a similar section showing a modification of the device showing a means of holding the seat from forward movement.

Figure 4 is a view showing a modified form of support.

Figure 5 is a section on the line 5—5 of Figure 2.

Figure 6 is a section on the line 6—6 of Figure 2.

Figure 8 is a section through an arm frame and hook in the form shown in Figure 3.

Figure 1:
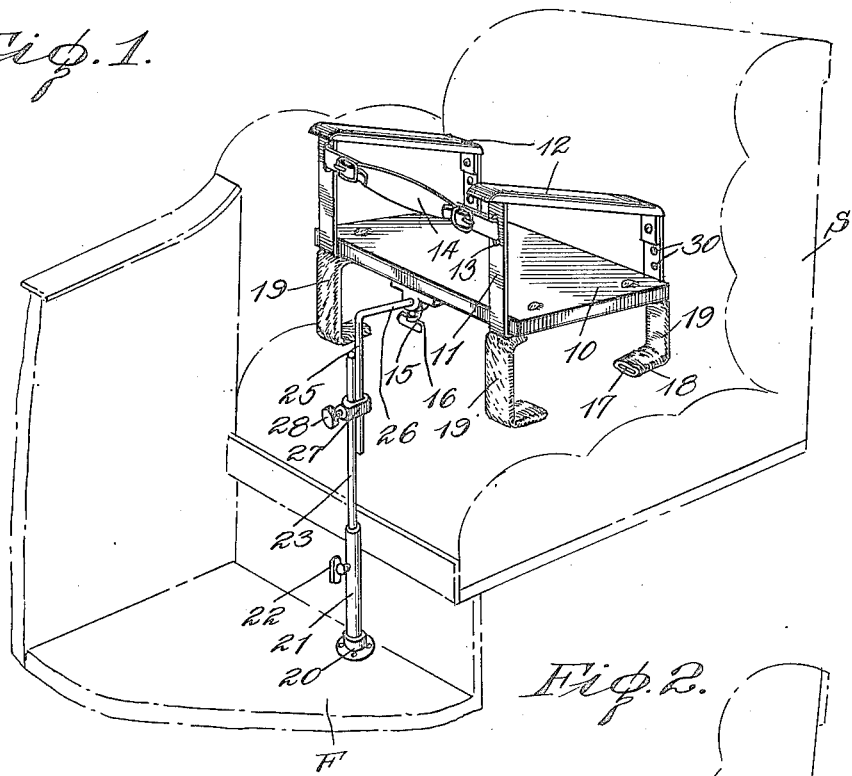
Figure 1 is a perspective view of the device showing its relation to an automobile seat.

In the embodiments of the invention herein disclosed several modifications have been illustrated in the drawings and in each instance the front seat of an automobile is indicated at S and the floor is shown at F. The invention itself comprises a seat portion 10 at each end of which is a trapezoid frame 11 of metal and to the tops of these frames are secured the arms 12. The front portion of these frames are provided with openings 13 to receive the ends of a body strap 14. Located centrally between the sides of this seat is a pair of alined sleeve lugs 15 provided with set screws 16. Also at each end is a frame having downwardly extending legs 17 provided within inturned feet 18, these legs and feet being covered with rubber tubing 19. This arrangement permits the main portion of the weight of the seat and child to be supported on the automobile seat.

Figure 2:
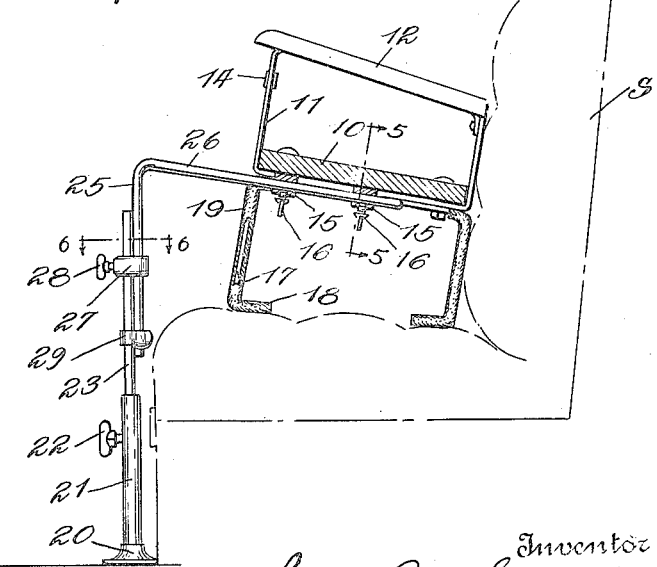
Figure 2 is a transverse section through the arrangement shown in Figure 1.
Figure 7:
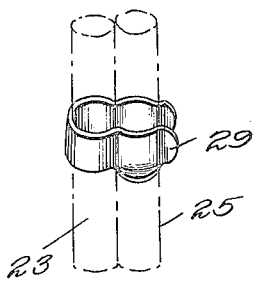
Figure 7 is a detail perspective of a bracing clip adapted to be used herewith.

Secured to the floor F is a floor plate 20 which is located close to the seat front of the automobile seat. Extending upward from this floor plate is a tubular standard 21 having a set screw 22 extending through the side wall to engage a rod 23 which thus telescopes in the standard 21. This rod 23 may either have its upper end bent laterally to pass through the sleeve lugs 15 as shown at 24 in Figure 4 or it may be made in two parts as shown in Figures 1 and 2, the upper part being indicated at 25 and provided with a laterally extending end 26, the two parts being clamped in adjusted relation by a clamp 27 having a set screw 28. An open supplemental spring clip 29 may also be used to hold these parts against any tendency to rotate. It is to be noted that, in the form shown in Figure 2 the tubular standard may be made considerably lower than in the form shown in Figure 4, the device being thus rendered more compact and less in the way when the rod 23 is removed.

In Figures 1 and 8 it will be seen that the arm frame is provided in its back portion with openings 30 through which may be passed bolts 31 which also pass through the front portion of a hook 32 covered with a rubber sleeve 33 by which the device may be hooked to the back of an automobile seat so the auxiliary seat will be held from jerking forward if the automobile be suddenly stopped. It will be noted that the bolts 31 not only serve to clamp the rubber sleeve in position and the hook on the arm frame but also serve to prevent the rubber sleeve from slipping longitudinally of the hook.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new is:—

1. The combination with an auxiliary seat; of a tubular standard adapted to be secured to an automobile floor in front of the automobile seat, a socket at the bottom of said standard and having openings therein for receiving screws to fixedly attach the standard in position, a rod telescopically mounted in said standard, means to hold the rod in adjusted position in the standard, and an arm extending from the rod beneath the auxiliary seat and supporting the same.

2. The combination with an auxiliary seat; of a standard adapted to be secured in a substantially vertical position in front of the seat of an automobile, a socket at the bottom of said standard and having openings therein for receiving screws to fixedly attach the standard in position, a member adjustable longitudinally of the standard and having an arm extending laterally to overhang the automobile seat, and means to secure the standard and member in adjusted relation.

3. The combination with an auxiliary seat; of a standard adapted to be secured in a substantially vertical position in front of the seat of an automobile, a socket at the bottom of said standard and having openings therein for receiving screws to fixedly attach the standard in position, a member adjustable longitudinally of the standard and having an arm extending laterally to overhang the automobile seat, said auxiliary seat being adjustable longitudinally of the arm, means to secure the standard and member in adjusted relation, and other means to secure the auxiliary seat in adjusted relation on the arm.

4. The combination with an auxiliary seat; of a standard adapted to be secured in a substantially vertical position in front of the seat of an automobile, a member adjustable longitudinally of the standard and having an arm extending laterally to overhang the automobile seat, said auxiliary seat being adjustable longitudinally of the arm, means to secure the standard and member in adjusted relation, other means to secure the auxiliary seat in adjusted relation on the arm, and legs depending from the seat and adapted to rest on the automobile seat to prevent tilting of the auxiliary seat.

5. The combination with the floor of an automobile and a seat of said automobile; of a tubular standard secured to said floor close to the front of said seat and extending vertically upward from said floor, a rod slidable vertically in said standard, a second rod adjacent the first, a clamp band surrounding the rods, a set screw passing through said band to force the rods together, an arm extending from the top of the second rod rearwardly over the seat, an auxiliary seat provided on its under side with sleeve lugs slidably mounted on said arm, set screws for said lugs arranged to engage and hold said arm, legs depending from said auxiliary seat and resting on the automobile seat, and hooks detachably connected to the auxiliary seat and engageable over the back of the automobile seat.

In testimony whereof I affix my signature.

SIM A. GRAY.